United States Patent [19]

Kawakami et al.

[11] 4,075,183

[45] Feb. 21, 1978

[54] PREPARATION OF WATER-SOLUBLE HIGH POLYMERS

[75] Inventors: Shigenao Kawakami, Hirakata; Tatsumi Shibata, Ibaraki; Shin-ichi Isaoka, Minoo; Tutomu Shintani, Ohita, all of Japan

[73] Assignee: Sumitomo Chemical Company, Limited, Osaka, Japan

[21] Appl. No.: 642,185

[22] Filed: Dec. 18, 1975

[30] Foreign Application Priority Data

Dec. 19, 1974 Japan .................................. 49-146371
July 10, 1975 Japan .................................. 50-85060

[51] Int. Cl.² .................. C08F 28/00; C08G 75/00; C08F 2/00; C08F 20/70
[52] U.S. Cl. .................. 260/79.3 MU; 260/79.3 M; 260/875; 260/885; 526/202; 526/209; 526/292; 526/303; 526/305; 526/307; 526/312
[58] Field of Search .................. 260/79.3 MU; 526/80, 526/79, 305, 307, 312, 303, 292

[56] References Cited

U.S. PATENT DOCUMENTS

| | | | |
|---|---|---|---|
| 3,025,219 | 3/1962 | Maeder | 526/80 |
| 3,296,167 | 1/1967 | Turner et al. | 526/80 |
| 3,509,113 | 4/1970 | Monagle et al. | 260/79.3 MU |
| 3,661,880 | 5/1972 | Markert et al. | 260/79.3 MU |
| 3,694,393 | 9/1972 | Lewis et al. | 260/79.3 MU |

FOREIGN PATENT DOCUMENTS 1,368,670 10/1974 United Kingdom.

Primary Examiner—Herbert J. Lilling
Attorney, Agent, or Firm—Birch, Stewart, Kolasch & Birch

[57] ABSTRACT

In the production of a water-soluble, cationic high polymer of (A) at least one of acrylamide and methacrylamide and (B) at least one of ammonium type monomers of either one of the formulas:

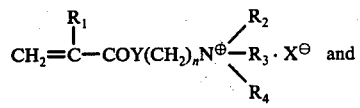

and

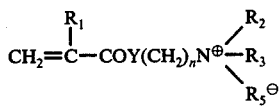

wherein $R_1$ is a hydrogen atom or a methyl group, $R_2$ and $R_3$ are each a lower alkyl group, $R_4$ is a hydrogen atom, a lower alkyl group, an aryl group, a hydroxy(lower)alkyl group, a benzyl group or a group of the formula: $-CH_2COO(CH_2)_mCH_3$ (m being an integer of 0 or 1), $R_5^-$ is a group of either one of the formulas: $-(CH_2)_2COO^-$ and $-(CH_2)_3SO_3^-$, X is a halogen atom or an acid residue, Y is $-O-$ or $-NH-$ and n is an integer of 1 to 4, a process which comprises initiating the polymerization of the monomeric component (A) with or without a portion of the monomeric component (B) in an aqueous medium containing an organic solvent selected from the group consisting of acetone, acetonitrile, t-butanol, tetrahydrofuran and dioxane at a concentration of about 15 to 70% by weight until the polymerization proceeds to a certain extent and then continuing the polymerization while adding the remaining portion of the monomeric component (B) thereto under the occasional supplementation of a water-miscible organic solvent thereto so as to keep an appropriate viscosity of the reaction system to produce the high polymer in a high yield with ease.

9 Claims, No Drawings

PREPARATION OF WATER-SOLUBLE HIGH POLYMERS

The present invention relates to a novel process for producing cationic polymers. More particularly, it relates to a novel process for production of water-soluble, cationic polymers in powder form having a high molecular weight.

As dehydration-promoting agents for treatment of surplus sludge and digested sludge which are produced by activated sludge treatments of various waste waters exhausted from excretion-treating works, drain-treating works and factories, there have hitherto been employed some inorganic materials such as ferrous sulfate, ferric chloride, quick lime and slaked lime. However, these inorganic materials must be used in large amounts so that the amount of sludge becomes increased to decrease the burning-up effect and to require large-sized apparatus.

Recently, the treatment of such sludge has become an important problem in the field of the waste water-treatment, and there has been raised a demand for a dehydration-promoting agent which can be employed in a small amount and afford an excellent dehydrating effect without decrease of the burning-up effect.

For this purpose, it has been proposed to use, as a dehydration-promoting agent, organic high polymer coagulants, for example, cationic high polymer coagulants such as cationic modified polyacrylamides, cationic polycondensation products and polyamines, but sufficient effect has not yet been attained therewith.

On the other hand, a variety of studies have heretofore been made on production of acrylamide type polymers. Industrially, the production is now effected, is most cases, by radical polymerization in the presence of a peroxide or a redox catalyst, usually in water (aqueous solution polymerization) or in an organic solvent which can dissolve starting monomers but can not dissolve produced polymers (precipitation polymerization).

The aqueous solution polymerization can afford a product with a high polymerization degree. In case of the precipitation polymerization, to the contrary, the polymerization degree is low, because of a strong chain transfer phenomenon, so that application in the field as mentioned above in which a high polymerization degree is required is difficult. On the other hand, the aqueous solution polymerization has the following disadvantages:

(1) Control of the exothermic polymerization in a concentrated aqueous solution is extremely difficult;

(2) The reaction solution becomes extremely viscous because of high polymerization degree so that stirring and handling of the reaction solution is difficult;

(3) The reaction must be effected in such a relatively dilute solution as being 10% or less in the monomer concentration, because the reaction heat causes, when not eliminated smoothly, reaction of amide groups to separate ammonia, whereby intermolecular or intramolecular imides are formed to afford useless, water-insoluble products.

On taking account of the recovery of the produced polymer from such a dilute reaction solution, it is desirable from the economical viewpoint that the product is present in granule form in the reaction solution. As well known, the produced polymer can be precipitated as a slurry by adding to the reaction solution a water-miscible organic solvent such as acetone as a precipitating agent. However, this precipitation method for isolation is disadvantageous in consuming an extremely large amount of solvents.

For overcoming such drawbacks, there has been proposed a method in which a mixture of water and a watermiscible organic solvent which does not dissolve the produced polymer is employed as the reaction medium for polymerization.

For example, U.S. Pat. No. 3,509,113 discloses a method in which the polymerization is effected in the presence of a mixture of acetone and water, the acetone concentration in the mixture being 30 to 70%, under the monomer concentration of 10 to 50%. Further, British Pat. No. 1,368,670 proposes a method in which the polymerization is effected in the presence of polyvinyl alcohol under the acetone concentration of 23 to 30%.

However, in case of using hygroscopic monomers such as ammonium type monomers, precipitation of the produced polymer as granules in the reaction system and sufficient dispersion of particles of the polymer as a slurry can be attained only when the acetone concentration is extremely high, but, in such condition, there can not be obtained a polymer with a high molecular weight to be desired.

As the result of the extensive study on the production of water-soluble acrylamide type polymers having an extremely large intrinsic viscosity by precipitation polymerization in a mixture of water and a water-miscible organic solvent, it has now been found that the adoption of certain specific reaction conditions and operations can afford polyacrylamide type polymers having an extremely high molecular weight in a good yield. The present invention is based on this finding.

According to the present invention, there is provided a process for producing a water-soluble, cationic high polymer by polymerization of (A) at least one of acrylamide and methacrylamide and (B) at least one of ammonium type monomers of either one of the formulas:

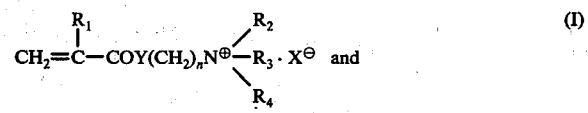

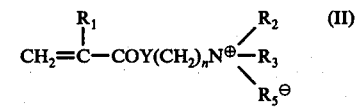

wherein $R_1$ is a hydrogen atom or a methyl group, $R_2$ and $R_3$ are each a lower alkyl group, $R_4$ is a hydrogen atom, a lower alkyl group, an aryl group, a hydroxy(lower)alkyl group, a benzyl group or a group of the formula: $-CH_2COO(CH_2)_mCH_3$ (m being an integer of 0 or 1), $R_5^-$ is a group of either one of the formulas: $-(CH_2)_2COO^-$ and $-(CH_2)_3SO_3^-$, X is a halogen atom or an acid residue, Y is $-O-$ or $-NH-$ and $n$ is an integer of 1 to 4, which comprises initiating the polymerization of the monomeric component (A) with or without a portion of the monomeric component (B) in an aqueous medium containing an organic solvent selected from the group consisting of acetone, acetonitrile, t-butanol, tetrahydrofuran and dioxane at a concentration of about 15 to 70% by weight until the polymerization proceeds to a certain extent and then continuing the polymerization while adding the remaining portion of the monomeric component (B) thereto under the occasional supplementation of a water-miscible organic solvent thereto so as to keep an appropriate viscosity of the reaction system.

One of the essential features in the process of the present invention is that the concentration of the organic solvent in the aqueous medium at the beginning of the polymerization is to be within a certain range. Another essential feature is that the polymerization is first initiated not with all of the starting monomers as the components of the polymer to be produced but with at least one of acrylamide and methacrylamide alone or in combination with a portion of the ammonium type monomer(s) and, after the polymerization proceeds to a certain extent, the remaining portion of the ammonium type monomer(s) is portionwise added to the reaction system to participate in the polymerization. A further essential feature is that the polymerization is effected with the occasional supplementation of the watermiscible organic solvent so as to regulate the viscosity of the reaction system. In case of any of these essential features being not met, the successful accomplishment of the present invention becomes hardly possible.

Explaining the concentration of the organic solvent in the aqueous medium at the beginning of the polymerization, it should be within a range of about 15 to 70% by weight. With a concentration lower than about 15% by weight, the viscosity of the reaction system becomes too large unless the monomer concentration is extremely reduced, and the stability of the slurry in the reaction system can not be obtained. With a concentration higher than about 70% by weight, the slurry is relatively stable, but a product with a high polymerization degree can not be obtained. A preferred range of the concentration of the organic solvent may be usually from about 15 to 50% by weight, although it is somewhat what varied with the change of the other reaction conditions such as the kind of the organic solvent, the monomer concentration and the reaction temperature.

The monomer concentration at the beginning of the polymerization is desired to be from about 10 to 50% by weight to the reaction system. The reaction temperature may be usually not higher than about 55° C, preferably not lower than about 5° C. With a lower monomer concentration and/or a lower reaction temperature, the reaction rate becomes extremely small, and a longer time is required for obtaining a viscosity of the reaction system sufficient for the addition of the ammonium type monomer(s), thus causing an extremely long duration of time for completion of the polymerization, which is a great disadvantage from the economical viewpoint. On the other hand, a higher monomer concentration and/or a higher reaction temperature makes the reaction rate too large, and the viscosity of the reaction system increases extraordinarily to make the slurry unstable. In such condition, the stability of the slurry can not be recovered by any means with the addition of the ammonium type monomer(s) or with the subsequent addition of the water-miscible organic solvent. Even if a produce with a relatively high degree of polymerization can be sometimes obtained, the yield is extremely lowered to make the industrial application almost impossible.

According to the invention, the polymerization is initiated first with the whole amount of acrylamide and/or methacrylamide along or in combination with a portion of the ammonium type monomer(s) in the aqueous medium. In case of the ammonium type monomer(s) being used from the beginning, its amount may be not more than about 50% by weight, preferably from about 1 to 15% by weight and more preferably from about 1 to 10% by weight on the basis of the amount of acrylamide and/or methacrylamide. Also, it may be from about 0.5 to 50% by weight, preferably from about 1 to 20% by weight and more preferably from about 2 to 10% by weight to the total amount of the ammonium type monomer(s) to be used in the polymerization.

Even if the polymerization is initiated with the acrylamide and/or methacrylamide along, it is possible to obtain a polymer having an extremely high molecular weight and being effective in the dehydration treatment of sludge. However, the flock formed by the use of such polymer in the dehydration treatment of sludge is sometimes soft and shows a high water content so that, on dehydration by the aid of a dehydrating machine, a part of the flock is destructed and, as the result, the water content in the dehydrated cake is increased.

When a portion of the ammonium type monomer(s) is used together with acrylamide and/or methacrylamide from the beginning, there is obtained a polymer which can afford a hard flock showing a low water content so that the destruction of the flock does not substantially occur on dehydration by the aid of a dehydrating machine and the water content of the dehydrated cake is low. Further, such polymer shows an excellent activity even when its molecular weight is relatively low in comparison with the product obtained by using no ammonium type monomer from the beginning. Thus, the use of the ammonium type monomer(s) from the beginning is usually recommended because of a better quality of the product. However, the use in an amount higher than about 50% by weight based on the amount of the acrylamide and/or methacrylamide is not favorable, because the slurry is made unstable. The use in an amount higher than about 50% by weight based on the total amount of the ammonium type monomer(s) to be employed in the polymerization is also not favorable, because the quality of the produced polymer is much deteriorated.

The incorporation of a water-soluble, protective colloid into the reaction system at the beginning of the polymerization is usually preferred for preventing the sticking of the produced polymer on the wall of the reaction apparatus or the inner surface of the pipes. As the watersoluble protective colloid, there may be exemplified polyvinyl alcohol, polyvinyl pyrrolidone, carboxymethylcellulose, hydroethylcellulose, etc. Among them, polyvinyl alcohol is particularly effective. The amount of the water-soluble protective colloid to be incorporated is preferably from about 0.5 to 5% by weight, particularly from about 1 to 2% by weight, to the amount of the monomers.

Further, the use of a catalyst affords an advantageous effect. Among conventional polymerization catalysts capable of releasing a radical on decomposition, anyone which can be dissolved in the aqueous medium as the reaction medium in the polymerization can be employed. Particularly preferred are a water-soluble peroxide such as potassium persulfate, ammonium persulfate or hydrogen peroxide and azobisisobutyronitrile. There may be also used a conventional redox catalyst such as the combination of potassium persulfate and sodium hydrogen sulfite or a tertiary amine or sodium formaldehyde sulfoxylate. The amount of the catalyst to be used may be usually from about 0.01 to 0.2% by weight to the amount of the monomers.

When the reaction is initiated under the said condition, the viscosity of the reaction system is gradually increased because of the produced prepolymer. After at least about 2 to 3%, preferably about 5% or more, of the monomers are polymerized, the rest amount of the ammonium type monomer(s) dissolved is portionwise added to the reaction system continuously or intermittently in 10 minutes or more, preferably 30 minutes or more. Usually, the time for the addition does not exceed 300 minutes. From the viewpoint of the management of the reaction, the continuous addition is preferable.

On the addition, the ammonium type monomer(s) are previously dissolved in water or its mixture with a water-miscible organic solvent so as to obtain a concentration being in a range from about 10% by weight to the saturation concentration, preferably from about 50% by weight to the saturation concentration. Examples of the water-miscible organic solvent are acetone, acetonitrile, t-butanol, tetrahydrofuran, dioxane, etc. These solvents may be used solely or in combination. The use of acetone, which can serve also as the reaction medium, is the most favorable, because it is not expensive and can be readily recovered due to its low boiling temperature.

When the addition of the ammonium type monomer(s) is effected too early or too rapidly, the reaction activity may be reduced abruptly, and a long time will be required for completion of the reaction. When the addition is effected too late or too slowly, the stability of the slurry may be lost and, even if a product with a high degree of polymerization is obtained, the yield is extremely lowered.

The proportion of the amounts of acrylamide and/or methacrylamide and of the ammonium type monomer(s) is determined depending on the quality of the polymer to be required and usually selected from the range of 95 – 10 : 5 – 90 (weight ratio). Generally, in case of the use for sludge being dehydrated with relative ease, a small amount of the ammonium type monomer(s) is employed, and for sludge being dehydrated with difficulty, a large amount of the ammonium type monomer(s) is employed.

When the reaction, initiated in the above mentioned manner, is continued under the same conditions, the viscosity of the reaction system is gradually increased with the progress of the reaction, and the stability of the slurry is lowered, whereby the stirring becomes finally impossible to make the control of the reaction extremely difficult. In the process of the invention, a small amount of a water-miscible organic solvent having a small chain transfer coefficient is added to the reaction system at the time when the viscosity of the reaction system arrives at a certain level with the progress of the reaction, more concretely, when the Weissenberg phenomenon is just on the point of appearing, so as to decrease the viscosity of the reaction system to such an extent that the Trommsdorff effect is not influenced. This operation is repeated until the completion of the reaction. In other words, the viscosity of the reaction system is maintained, during the polymerization, in such a range that the Trommsdorff effect is not influenced and the Weissenberg phenomenon is just on the point of appearing, whereby the polymerization can be smoothly completed with a stable slurry state.

The amount of the water-miscible organic solvent to be used at each addition is preferably from about 1 to 5% by weight to the total amount of the reaction system. With a too large amount, the viscosity of the reaction system becomes too small so that the reaction rate is extremely lowered and a product with a high polymerization degree can not be obtained. With a too small amount, the viscosity-reducing effect is insufficient so that the control of the reaction is difficult. The number of times of the addition is appropriately decided depending on the polymerization activity and other polymerization conditions. At least one time of the addition is necessary. In usual, the addition is effected 3 to 8 times. Besides such intermittent addition process, a continuous addition process is also adaptable. Namely, the organic solvent may be added continuously to the reaction system in such a manner that the Trommsdorff effect is not influenced and the Weissenberg phenomenon is not caused. The manner for addition of the water-miscible organic solvent is not essential, and the continuous addition is favorable from the viewpoint of the management of the reaction. Examples of the water-miscible organic solvent to be used are acetone, acetonitrile, t-butanol, tetrahydrofuran, dioxane, etc. These solvents may be used solely or in combination, or in the form of a mixture with water. The use of acetone, which serves also as the reaction medium, is particularly favorable, because it is a cheap solvent and can be readily recovered due to its low boiling temperature.

Thus, as one of the typical procedures, the process of the invention may be performed by initiating the polymerization with acrylamide or methacrylamide alone in an aqueous medium containing the said organic solvent at a concentration of from about 15 to 50% by weight at a temperature from about 5° to 55° C until 2% or more of the monomer component is polymerized and then continuing the polymerization while adding thereto a solution of the ammonium type monomer(s) in water or its mixture with the water-miscible organic solvent under the supplementation of the water-miscible organic solvent so as to maintain an appropriate viscosity of the reaction system.

As another typical procedure, the process of the invention may be performed by initiating the polymerization with acrylamide or methacrylamide and a portion of the ammonium type monomer(s) in an aqueous medium containing the said organic solvent at a concentration of from about 15 to 70% by weight at a temperature from about 5° to 55° C until 2% or more of the monomer components is polymerized and then continuing the polymerization while adding thereto a solution of the rest portion of the ammonium type monomer(s) in water or its mixture with the water-miscible organic solvent under the supplementation of the water-miscible organic solvent so as to maintain an appropriate viscosity of the reaction system.

For isolation of the produced water-soluble, cationic high polymer from the reaction mixture, a large amount (usually about 1.0 to 10.0 times as large as the weight of the organic solvent used at the beginning of the reaction) of a water-miscible organic solvent which does not dissolve the produced polymer is added to the reaction mixture to precipitate well the produced polymer, which is then collected by filtration and, if necessary, washed and dried to obtain a final product. It is effective for obtaining uniform particles of the produced polymer to add to the reaction mixture the said organic solvent previously in an amount of about 0.1 to 1.0 times as large as the weight of the organic solvent used at the beginning of the reaction, prior to the addition in large amount, and to warm the resultant mixture at about 30° to 60° C, preferably about 35° to 55° C. Examples of the water-miscible organic solvent to be used are acetone, acetonitrile, t-butanol, tetrahydrofuran, dioxane, etc. The use of acetone, which serves also as the reaction medium, is the most favorable, because it is a cheap solvent and can be readily recovered.

The addition of the water-miscible organic solvent to the reaction mixture is effected for the following reason. Namely, in the reaction mixture after completion of the polymerization, a part of the surface of the particles of the produced polymer is dissolved in water present in the reaction system and thus made adhesive so that the filtration of the reaction mixture as such is relatively difficult. By the addition of the organic solvent to the reaction mixture, the concentration of water is lowered to diminish the dissolution of the polymer in water and, as the result, to prevent the surface of the polymer from becoming adhesive, which makes the filtration easy. At the same time, unreacted starting materials can be washed and eliminated thereby to afford a product with high purity.

Thus, according to the process of the invention, a water-soluble high polymer with an extremely high molecular weight can be obtained with ease in a good yield. This is of great industrial value, since the production of such polymer has been impossible or very difficult by conventional precipitation polymerization processes. Further, the water-soluble polymer obtained according to the invention shows, because of its extremely high molecular weight, a dehydrating activity superior to that of conventional water-soluble polymers and that of a simple mixture of the corresponding homopolymers obtained from the monomers used in the invention. Moreover, the water-soluble polymer obtained by the invention is utilizable not only as a dehydrating agent but also in sedimentation separation of accumulated sludge containing organic materials.

Still, it may be noted that, when the whole amount of the ammonium type monomer(s) is subjected to the reaction from the beginning together with acrylamide and/or methacrylamide, an extremely high concentration of the organic solvent is required for dispersing sufficiently the particles of the produced polymer as a slurry so that a polymer with a high molecular weight can not be obtained and the yield is lowered.

Practical and presently preferred embodiments of the invention are illustratively shown in the following Examples.

EXAMPLE 1

In a reaction apparatus, a mixture of water (107 g), acetone (51 g), acrylamide (45.0 g) and a 5% aqueous solution of polyvinyl alcohol (PVA: Gosenol GH-17) (10 g) is neutralized with 1 to 2 drops of 1 N-NaOH. The atmosphere in the reaction apparatus is well replaced with nitrogen gas to expel oxygen completely. Then, a 1% aqueous solution of potassium persulfate (2.1 ml) and a 2% aqueous solution of acid sodium sulfite (2.1 ml) are added thereto, whereby the reaction begins within a few minutes, and the reaction solution being uniform and transparent at first begins to be white and turbid with the progress of the reaction. Ten minutes thereafter, a mixture of water (36.5 g), dimethylaminoethyl methacrylate hydrochloride (55.0 g) and acetone (24 g) is continuously added in about 40 minutes while maintaining an appropriate viscosity of the reaction system, and stirring is continued at 25° C in nitrogen stream. After about 45 minutes, a Weissenberg phenomenon is just on the point of appearing, so that acetone is gradually added to reduce the viscosity of the system, and the polymerization is further continued. Then, acetone (50 g) is continuously added in about 200 minutes, in order to keep the viscosity of the system in such a range that the Trommsdorff effect is not influenced and the Weissenberg phenomenon does not appear. The reaction is further continued for 3 hours thereafter. After completion of the reaction, acetone (25 g) is added to the reaction mixture, the temperature is elevated up to about 40° C, and acetone (200 g) is further added to precipitate the product, which is collected by filtration to obtain a polymer in powder form. The thus obtained polymer is washed with acetone several times and dried at 50° C to obtain a final product as water-soluble white granules. Yield, 95%. Intrinsic viscosity, 8.5 (at 30° C in 1 N-NaNO$_3$).

EXAMPLE 2

The polymerization is effected in the same manner as in Example 1 but using another salt or quaternary compound of dimethyl(or diethyl)aminoethyl methacrylate in place of dimethylaminoethyl methacrylate hydrochloride. The results are shown in Table 1. All of the produced polymers show a good water-solubility.

Table 1

| Ammonium type monomer (I) or (II) | Yield (%) | Intrinsic viscosity (at 30° C in N-NaNO$_3$) |
|---|---|---|
| Sulfate of DAM[1] | 95 | 8.2 |
| Acetate of DAM | 85 | 8.5 |
| Quaternary compound of DAM with dimethyl sulfate | 90 | 9.0 |
| Quaternary compound of DAM with methyl chloride | 93 | 8.0 |
| Quaternary compound of DAM with methyl iodide | 97 | 8.7 |
| Quaternary compound of DAM with benzyl chloride | 87 | 7.8 |
| Quaternary compound of DAM with β-propiolactone | 85 | 8.1 |
| Quaternary compound of DAM with methyl chloroacetate | 91 | 7.9 |
| Hydrochloride of DEAM[2] | 89 | 7.5 |
| Nitrate of DEAM | 83 | 7.1 |
| Sulfate of DEAM | 91 | 8.1 |
| Quaternary compound of DEAM with dimethyl sulfate | 90 | 7.6 |
| Quaternary compound of DEAM with methyl iodide | 95 | 8.7 |
| Quaternary compound of DEAM with methyl chloride | 90 | 8.1 |
| Quaternary compound of DEAM with methyl chloroacetate | 90 | 7.5 |
| Quaternary compound of DEAM with ethyl chloroacetate | 89 | 7.7 |
| Quaternary compound of DEAM with sultone | 87 | 8.0 |

[1] DAM: Dimethylaminoethyl methacrylate
[2] DEAM: Diethylaminoethyl methacrylate.

EXAMPLE 3

The polymerization is effected in the same manner as in Example 1 but using N-(N,N-dimethylethyl)acrylamide hydrochloride in place of dimethylaminoethyl methacrylate hydrochloride and methacrylamide in place of acrylamide to obtain a polymer having an intrinsic viscosity of 5.5 (at 30° C in 1 N-NaNO$_3$). Yield, 89%. The thus obtained polymer is in a form of white powders showing an excellent water-solubility.

EXAMPLE 4

The polymerization is effected in the same manner as in Example 1 but using N-(N,N-dimethyl-n-propyl)acrylamide hydrochloride in place of dimethylaminoethyl methacrylate hydrochloride to obtain a polymer having an intrinsic viscosity of 4.8 (at 30° C in 1 N-

NaNO₃). Yield, 91%. The thus obtained polymer also shows an excellent water-solubility.

EXAMPLE 5

In a reaction apparatus, a mixture of water (277 g), acetone (120 g), acrylamide (107 g), a quaternary compound of dimethylaminoethyl methacrylate with methyl chloride (hereinafter referred to as "DAM-CH₃Cl") (8 g) and a 5% aqueous solution of polyvinyl alcohol (22 g) is neutralized with a few drops of 1 N-NaOH. The atmosphere in the apparatus is well replaced with nitrogen gas to expel oxygen completely. Then, a 1% aqueous solution of potassium persulfate (5 ml) and a 2% aqueous solution of tetramethylethylenediamine (5 ml) are added thereto, whereby the reaction begins within a few minutes and the reaction solution begins to be viscous with the progress of the reaction. Fifteen minutes thereafter, a solution of DAM-CH₃Cl (152 g) in water (48 g) is added continuously in about 120 minutes, during which acetone (16 g) is continuously added in order to stabilize the slurry. Stirring continued at 20° C in nitrogen stream, and after about 70 minutes, a Weissenberg phenomenon is just on the point of appearing, so that acetone (8 g) is gradually added to reduce the viscosity of the system. Then, the polymerization reaction is continued while adding acetone (8 g) at intervals of 0.5 to 1.5 hours so as to keep the viscosity of the reaction system in such a range that the Trommsdorff effect is not influenced and the Weissenberg phenomenon does not appear. Eight hours after the beginning of the reaction, acetone (120 g) is added to the reaction mixture, the temperature is elevated up to about 40° C and acetone (400 g) is further added to precipitate a product, which is collected by filtration to obtain a polymer in powder form. The thus obtained polymer is washed with acetone several times and dried at 50° C to obtain a final product. This substance shows an excellent water-solubility. Yield, 95%. Intrinsic Viscosity, 7.9 (at 30° C in 1 N-NaNO₃).

The above procedure is repeated but changing the reaction temperature and the reaction time, whereby the results as shown in Table 2 are obtained:

Table 2

| Experimental No. | Reaction temperature (° C) | Reaction time hours | Yield (%) | [η] |
|---|---|---|---|---|
| 1 | 10 | 12 | 91 | 8.4 |
| 2 | 20 | 8 | 95 | 7.9 |
| 3 | 30 | 8 | 99 | 7.0 |
| 4 | 40 | 7 | 99 | 6.3 |

EXAMPLE 6

In a reaction apparatus, a mixture of water (277 g), acetone (120 g), acrylamide (107 g), a quaternary compound of dimethylaminoethyl methacrylate with dimethyl sulfate (hereinafter referred to as "DAM-S") (5 g) and a 5% aqueous solution of polyvinyl alcohol (22 g) is neutralized with a few drops of 1 N-NaOH. The atmosphere in the apparatus is well replaced with nitrogen gas to expel oxygen completely. Then, a 1% aqueous solution of potassium persulfate (8 ml) and a 2% aqueous solution of acid sodium sulfite (8 ml) are added thereto, whereby the reaction begins within a few minutes and the reaction solution begins to be viscous with the progress of the reaction. Twenty-five minutes thereafter, a solution of DAM-S (41 g) in water (11 g) is continuously added in about 60 minutes, and stirring is further continued at 20° C in nitrogen stream. After about 100 minutes, a Weissenberg phenomenon is just on the point of appearing, so that acetone is added as in Example 5 so as to stabilize the slurry, and the polymerization is continued as in Example 5. The thus obtained polymer is in a form of white granules having a good water-solubility. Yield, 98%. Intrinsic viscosity, 8.5 (at 30° C).

EXAMPLE 7

The polymerization is effected in the same conditions (monomer concentrations, acetone concentration, reaction temperature, etc.) is in Example 5 but using another quaternary compound or salt of dimethyl(or diethyl)aminoethyl methacrylate in place of DAM-CH₃Cl. The results are shown in Table 3. All of the produced polymers show a good water-solubility.

Table 3

| Ammonium type monomer (I) or (II) | Yield (%) | Intrinsic viscosity (at 30° C in N-NaNO₃) |
|---|---|---|
| Hydrochloride of DAM[1] | 98 | 7.6 |
| Sulfate of DAM | 98 | 7.5 |
| Quarternary compound of DAM with dimethyl sulfate | 99 | 8.5 |
| Quaternary compound of DAM with β-propiolactone | 7.8 83 | 7.8 |
| Quaternary compound of DAM with methyl chloroacetate | 90 | 7.2 |
| Hydrochloride of DEAM[2] | 95 | 7.0 |
| Sulfate of DEAM | 98 | 7.5 |
| Quaternary compound of DEAM with dimethyl sulfate | 99 | 7.7 |
| Quaternary compound of DEAM methyl chloride | 99 | 8.0 |
| Quaternary compound of DEAM with methyl chloride | 85 | 7.5 |
| Quaternary compound of DEAM with sultone | 83 | 6.8 |

[1] DAM: Dimethylaminoethyl methacrylate
[2] DEAM: Diethylaminomethyl methacrylate

EXAMPLE 8

The polymerization is effected in the same manner as in Example 6 but using a quaternary compound of N-(N,N-dimethylethyl)acrylamide with dimethyl sulfate in place of DAM-S to obtain a polymer showing a good water-solubility. Intrinsic viscosity, 6.7 (at 30° C in 1 N-NaNO₃).

COMPARATIVE EXAMPLE 1 (Method of British Patent No. 1,368,670):

In a reaction apparatus, a mixture of water (325 g), acetone (136 g), acrylamide (107 g), DAM-CH₃Cl (160 g) and a 5% aqueous solution of polyvinyl alcohol (22 g) is neutralized with a few drops of 1 N-NaOH. The atmosphere in the apparatus is well replaced with nitrogen gas to expel oxygen completely. Then, a 1% aqueous solution of potassium persulfate (8 ml) and a 2% aqueous solution of tetramethyl-ethylenediamine (8 ml) are added thereto, whereby the reaction begins within a few minutes. Thirty minutes after the beginning of the reaction, a strong Weissenberg phenomenon appears, so that control of the reaction becomes impossible.

COMPARATIVE EXAMPLE 2 (Method of British Patent No. 1,368,670):

In a reaction apparatus, a mixture of water (288 g), acetone (120 g), acrylamide (107 g), DAM-S (46 g) and a 5% aqueous solution of polyvinyl alcohol (22 g) is neutralized with 1 N-NaOH. The atmosphere in the apparatus is well replaced with nitrogen gas to expel oxygen. Then, a 1% aqueous solution of potassium persulfate (5 ml) and a 2% aqueous solution of tetramethylethylenediamine (5 ml) are added thereto. Ninety minutes after the beginning of the reaction, a Weissenberg phenomenon appears, and the control of the reaction slurry becomes impossible, as in Comparative Example 1.

COMPARATIVE EXAMPLE 3

The polymerization is effected in the same manner as in Example 1, 2, 3, 4, 5, 6, or 7 but not adding acetone as the regulator for the viscosity of the reaction system, whereby the slurry is coagulated in about 1 to 2 hours.

REFERENCE EXAMPLE 1

A water-soluble cationic polymer is prepared in the same manner as in Example 1 but using methacrylamide (MAA) and a quaternary compound of dimethylaminoethyl methacrylate with dimethyl sulfate (DAM-S) in amounts as shown in Table 4.

On the other hand, methacrylamide and a quaternary compound of dimethylaminoethyl methacrylate with dimethyl sulfate are separately polymerized to obtain corresponding homopolymers, which are admixed each other in a proportion as shown in Table 4 to obtain a polymer mixture.

Each of the polymers of the invention and the said polymer mixtures obtained above is added in a concentration of 100 ppm to organic sludges (200 ml) exhausted from petrochemical factories, and the amount of filtrate solution after 20 seconds is determined to compare the dehydrating activity.

The results are shown in Table 4. A larger amount of the filtrate solution means a higher dehydrating activity.

Table 4

|  | Blended amount (g) |  | Amount of filtrate solution (ml) |
|---|---|---|---|
|  | MAA | DAM-S |  |
| Polymer of invention | 90 | 10 | 100 |
|  | 70 | 30 | 105 |
|  | 50 | 50 | 130 |
|  | 30 | 70 | 145 |
|  | 10 | 90 | 155 |
| Polymer mixture | 90 | 10 | 30 |
|  | 70 | 30 | 60 |
|  | 50 | 50 | 75 |
|  | 30 | 70 | 90 |
|  | 10 | 90 | 95 |

The blended amounts indicate the amounts of the monomers in case of the polymers of the invention and the amounts of the polymers in case of the polymer mixtures.

What is claimed is:

1. In the production of a water-soluble, cationic high polymer of (A) at least one of acrylamide and methacrylamide and (B) at least one of ammonium type monomers of either one of the formulas:

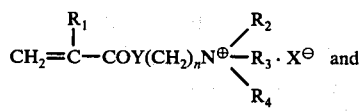  (I)

-continued

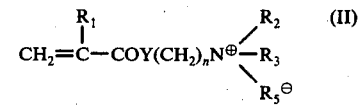  (II)

wherein $R_1$ is a hydrogen atom or a methyl group, $R_2$ and $R_3$ are each a lower alkyl group, $R_4$ is a hydrogen atom, a lower alkyl group, an aryl group, a hydroxy(lower)alkyl group, a benzyl group or a group of the formula: $-CH_2COO(CH_2)_mCH_3$ ($m$ being an integer of 0 or 1), $R_5^-$ is a group of either one of the formulas: $-(CH_2)_2COO^-$ and $-(CH_2)_3SO_3^-$, X is a halogen atom or an acid residue, Y is $-O-$ or $-NH-$ and $n$ is an integer of 1 to 4, a process which comprises initiating the polymerization of the monomeric component (A) with a portion of the monomeric component (B) in an aqueous medium containing an organic solvent selected from the group consisting of acetone, acetonitrile, t-butanol, tetrahydrofuran and dioxane at a concentration of about 15 to 70% by weight until the polymerization proceeds to a certain extent and then continuing the polymerization while adding the remaining portion of the monomeric component (B) thereto under the occasional supplementation of a watermiscible organic solvent thereto so as to keep an appropriate viscosity of the reaction system to produce the high polymer.

2. The process according to claim 1, wherein the the concentration of the organic solvent in the aqueous medium at the beginning is from about 15 to 50% by weight.

3. The process according to claim 1, wherein the organic solvent in the aqueous medium at the beginning is acetone.

4. The process according to claim 1, wherein the monomer component at the beginning contains the component (B) in an amount of not more than about 50% by weight on the basis of the weight of the monomeric component (A).

5. The process according to claim 1, wherein the monomer component at the beginning contains the monomeric component (B) in an amount of from about 0.5 to 50% by weight on the basis of the total amount of the monomeric component (B) to be used in the polymerization.

6. The process according to claim 1, wherein the polymerization is carried out at a temperature not higher than about 55° C.

7. The process according to claim 1, wherein the proportion of the component (A) and the component (B) to be polymerized is from about 95 : 5 to 10 : 90 by weight.

8. The process according to claim 1, wherein the polymerization at the initial stage is carried out until about 2% or more of a mixture of the monomeric components (A) and (B) is polymerized.

9. The process according to claim 1, wherein the concentration of a mixture of the monomeric components (A) and (B) in the aqueous medium at the beginning is from about 10 to 50% by weight.

* * * * *